US012765464B2

(12) United States Patent
Bartels et al.

(10) Patent No.: US 12,765,464 B2
(45) Date of Patent: Oct. 20, 2026

(54) AGRICULTURAL WORK IMPLEMENT TO BE ATTACHED OR HITCHED TO A TOWING VEHICLE AND METHOD OF SETTING UP A ROAD OPERATION OF AN AGRICULTURAL WORK IMPLEMENT

(71) Applicant: Maschinenfabrik Bernard Krone GmbH & Co. KG, Spelle (DE)

(72) Inventors: Markus Bartels, Meppen (DE); Richard Büter, Sögel (DE); Jens Lömker, Hopsten (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 507 days.

(21) Appl. No.: 18/320,047

(22) Filed: May 18, 2023

(65) Prior Publication Data

US 2023/0371432 A1 Nov. 23, 2023

(30) Foreign Application Priority Data

May 19, 2022 (DE) ........................ 102022112568.8

(51) Int. Cl.
*A01D 67/00* (2006.01)
*A01D 69/00* (2006.01)
*A01D 101/00* (2006.01)

(52) U.S. Cl.
CPC ........... *A01D 69/002* (2013.01); *A01D 67/00* (2013.01); *A01D 2101/00* (2013.01)

(58) Field of Classification Search
CPC .. A01D 69/002; A01D 41/144; A01D 41/148; A01D 78/144
See application file for complete search history.

(56) References Cited

U.S. PATENT DOCUMENTS 3,473,302 A * 10/1969 Caldwell .............. A01D 34/661 56/6
3,740,534 A * 6/1973 Kezer ................... B66C 23/905 212/277

(Continued)

FOREIGN PATENT DOCUMENTS

EP 0517632 A1 12/1992
EP 1665922 A1 6/2006
EP 3266292 A1 1/2018

OTHER PUBLICATIONS

Extended European Search Report in EP23173663.8, mailed Oct. 25, 2023, 6 pages.

*Primary Examiner* — Cathleen R Hutchins
(74) *Attorney, Agent, or Firm* — McKee, Voorhees & Sease, PLC

(57) ABSTRACT

An agricultural work implement, in particular a mowing unit, for attachment to a towing vehicle is disclosed, along with method of road operation setup, that includes an attachment frame, on which a telescopic support arm is pivotably and/or shiftably arranged, at least one aggregate hinged to the support arm, a gearbox which can be connected to a power take-off shaft of the towing vehicle in a power-receiving manner, and a variable-length output shaft, which is arranged in a power-transmitting manner between the gearbox and the aggregate, wherein the aggregate is positionally changeable by pivoting and/or shifting the support arm and is reversibly adjustable from a field configuration provided for field operation into a transport configuration provided for road operation. The telescoping and/or pivoting of the support arm and/or the adjustment of the gearbox occurs in different sequences as a function of current positions of the support arm and/or the gearbox.

13 Claims, 10 Drawing Sheets

(56) References Cited

U.S. PATENT DOCUMENTS

| | | | | | |
|---|---|---|---|---|---|
| 5,348,226 | A * | 9/1994 | Heiniger | A01M 7/0057 | 239/164 |
| 5,673,543 | A * | 10/1997 | Richardson | A01D 41/144 | 56/85 |
| 10,448,573 | B1 * | 10/2019 | Bellamy | A01D 69/03 | |
| 2013/0000268 | A1 * | 1/2013 | Arnold | A01B 73/067 | 56/367 |
| 2015/0245556 | A1 * | 9/2015 | Prickel | A01C 7/208 | 701/50 |
| 2021/0127575 | A1 * | 5/2021 | Farley | A01B 63/10 | |

* cited by examiner

AGRICULTURAL WORK IMPLEMENT TO BE ATTACHED OR HITCHED TO A TOWING VEHICLE AND METHOD OF SETTING UP A ROAD OPERATION OF AN AGRICULTURAL WORK IMPLEMENT

CROSS REFERENCE TO RELATED APPLICATIONS

This application claims priority under 35 U.S.C. § 119 to German Patent Application DE 10 2022 112 568.8, filed May 19, 2022, which is herein incorporated by reference in its entirety, including without limitation, the specification, claims, and abstract, as well as any figures, tables, appendices, or drawings thereof.

FIELD OF THE INVENTION

The present invention relates to an agricultural work implement, in particular a mowing unit, for attachment to a towing vehicle.

BACKGROUND OF THE INVENTION

The background description provided herein gives context for the present disclosure. Work of the presently named inventors and aspects of the description that may not otherwise qualify as prior art at the time of filing are neither expressly nor impliedly admitted as prior art.

In agriculture, machines and implements with increasingly larger working widths are used to meet the steadily rising demand for higher performance and economic return. This applies in particular to front-mounted and attachment implements, as well as mowing units or haymaking machines, which are attached to or towed by a self-propelled agricultural machine such as, for example, a hauler, forage harvester or similar, and which are drive-connected to it by a drive shaft or power take-off. In order to enable road transport of such machines and implements, they can regularly be transferred from a work setting intended for field use, in which they can occupy a large working width, to a compact transport setting, in which they meet the legal requirements with regard to their dimensions for use in road traffic. Transfer mechanisms for this purpose regularly require length compensation in the driveline when pivoting and/or shifting. For this reason, variable-length cardan shafts are therefore often used to drive the aggregates. In this case, the aim is for the cardan shafts to have a very high degree of adjustability, on the one hand to enable the most compact dimensions possible in the transport setting and, on the other hand, a large working width in field operation. In addition, the maximum adjustment travel of cardan shafts is limited in relation to their overall length. As regards the telescoping capability of cardan shafts, the greater the relationship of maximum length to minimum length, the more detrimental it is to the cost and sturdiness of the cardan shafts. The working width of the machines and implements is therefore limited in technical and economic terms by the adjustability of the cardan shafts. In order to fulfill these requirements, triple telescopic cardan shafts are already often used. These are, however, comparatively expensive.

WO 2011/112080 A1 discloses a haymaking machine in which side arms are attached to a main support beam, each of which side arm supports at least one harvest processing tool. The side arms are connected in an articulated manner to a slide bearing which is shiftable along the main support beam such that the side arms can be reversibly transferred from a work setting to a transport setting. To drive the harvest processing tools, the haymaking machine comprises a transfer case to which two telescopic drive shafts are connected on the output side. The transfer case is shiftably mounted along support rails on a carriage. When the side arms are transferred from the work setting to the transport setting, the carriage and the slide bearing are shifted, at least in certain areas, in a coupled manner.

By means of a shifting of the transfer case, the required length compensation of the drive shafts is reduced when transferring the side arms from the work setting to a transport setting.

DE 10 2018 118 971 A1 discloses an agricultural attachment implement with a transfer case that comprises output shafts on the output side, on which output shafts are arranged universal joint shafts for the driving of work aggregates. Due to an acute-angled arrangement of the output shaft relative to an erect longitudinal center plane of the attachment implement, the cardan shafts do not extend parallel to the support arms carrying the working aggregates, but rather spread at an acute angle to them. In so doing, this results in smaller buckling angles when the support arms are pivoted, and in reduced sliding paths when the support arms are telescoped or shifted longitudinally, which are reflected in lesser changes in the length of the propeller shafts.

Thus, there exists a need for an agricultural work implement with an even greater working width than in the prior art, which can be transferred in an operationally safe manner by inexpensive technical means from a work setting in which its working width is adjustable, in particular reversibly from minimum to maximum, to a transport setting in which it meets the requirements for road operation, wherein the agricultural work implement is also very easy for the operator to operate.

SUMMARY OF THE INVENTION

The following objects, features, advantages, aspects, and/or embodiments are not exhaustive and do not limit the overall disclosure. No single embodiment needs to provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

There is an illustrative, but nonlimiting, embodiment that includes an agricultural work implement, in particular a mowing unit, for attachment to a towing vehicle, that includes an attachment frame, on which a telescopic support arm is pivotably and/or shiftably arranged, at least one aggregate hinged to the support arm, a gearbox which can be connected to a power take-off shaft of the towing vehicle in a power-receiving manner, and a variable-length output shaft, which is arranged in a power-transmitting manner between the gearbox and the aggregate, wherein the aggregate is positionally changeable by pivoting and/or shifting the support arm, and is reversibly adjustable from a field configuration provided for field operation, in which the support arm is pivoted into a flat position that is approximately parallel to the ground, and reversibly telescopic from a retracted sliding position into an extended sliding position, into a transport configuration provided for road operation, in which the support arm is pivoted into a folding position that is erect with respect to the flat position, and is shifted into the retracted sliding position, wherein the gearbox is adjustable from a home position, in which it is drive-connectable or drive-connected to the aggregate, into a shift position for setting up road operation. The invention further relates to a method for the setting up of road operation of an agricultural work implement.

There is another illustrative, but nonlimiting, embodiment that is a method for setting up a road operation of an agricultural work implement, in particular according to any one of the previous claims, in which a position of an aggregate, which aggregate is hinged to the work implement via a telescopic support arm, is adjusted by pivoting and/or shifting the support arm, such that the aggregate reversibly pivots from a field configuration provided for field operation, in which the support arm is pivoted into a flat position that is approximately parallel to the ground, and is reversibly telescopic from a retracted sliding position into an extended sliding position, into a transport configuration provided for road operation, in which the support arm is pivoted into a folding position which is erect with respect to the flat position and is transferred into the retracted sliding position, characterized in that during the transfer of the aggregate from the field configuration into the transport configuration, the telescoping and/or pivoting of the support arm and/or the shifting of the gearbox takes place in different sequences as a function of current positions of the support arm and/or current positions of the gearbox.

An agricultural work implement for attachment to a towing vehicle is created for this purpose. The towing vehicle can be, for example, a tractor or hauler, or a self-propelled harvester such as a forage harvester or the like. The agricultural work implement may be a towed work implement. Further, it may be provided for front or rear attachment to the towing vehicle. In a preferred embodiment, the agricultural work implement is a mowing machine or a haymaking machine.

The work implement comprises an attachment frame on which a telescopic support arm is pivotably and/or shiftably arranged. At least one aggregate is articulated on the support arm. The work implement, furthermore, includes a gearbox that can be connected to a power take-off shaft of the towing vehicle to receive power. A variable-length output shaft is also arranged between the gearbox and the aggregate to transmit power. The aggregate can therefore be driven via the output shaft.

The aggregate is provided for harvesting and/or processing of harvest material. In the embodiment as a mowing machine, the mowing machine comprises mowing discs or a mowing bar on which are arranged a plurality of blades distributed over a working width of the aggregate. In the embodiment as a haymaking machine, the aggregate comprises at least one rake on which tines are arranged.

The aggregate is positionally changeable by pivoting and/or shifting the support arm. It is thereby reversibly adjustable from a field configuration provided for field operation, in which the support arm is pivoted into a flat position that is approximately parallel to the ground, and reversibly telescopic from a retracted sliding position into an extended sliding position, into a transport configuration provided for road operation, in which the support arm is pivoted into a folding position that is erect with respect to the flat position, and is shifted into the retracted sliding position. The position of the support arm, in particular, an amount by which the support arm is telescoped from the retracted sliding position, and a pivoting angle by which the support arm is pivoted from the approximately ground-parallel flat position, therefore defines the position of the aggregate.

In the transport configuration, in which, on level terrain, the aggregate is arranged in the erect folding position, the support arm extends in a vertical upward direction or at a (small) acute angle thereto, wherein the angle is preferably not greater than 50°, particularly preferably not greater than 35°.

In the transport configuration, in which the support arm is adjusted into the retracted sliding position, the aggregate does not exceed a permissible height for road traffic, in particular 3 meters. In the case of a particularly large working width, the support arm must therefore be at least partially or even completely shifted from the extended sliding position, in which the work implement assumes its maximum working width, into the retracted sliding position, in which the working width is minimal.

The gearbox is adjustable from a home position, in which it is drive-connectable or drive-connected to the aggregate, to a shift position for setting up road operation. By shifting the gearbox, an optimized ratio of maximum to minimum length of the output shaft is achieved even with a very long support arm, which is to say, a very large working width, while also optimizing the costs and robustness of the output shaft.

The work implement is characterized in that when the aggregate is transferred from the field configuration to the transport configuration, the telescoping and/or pivoting of the support arm and/or the adjustment of the gearbox takes place in different sequences as a function of the current positions of the support arm and/or one current position of the gearbox. The support arm and/or the gearbox are adjusted in a different sequence, as a function of the current position of the support arm, which is to say, in particular, in a flat position or a folding position or an intermediate position between the flat position and the folding position, and/or a retracted position or an extended position or an intermediate position between the retracted and the extended position, by way of example, a headland position, and/or as a function of the current position of the gearbox, which is to say, in particular in the home position or the shift position or possibly an intermediate position between the home position and the shift position. To set up road operation, the telescoping and/or pivoting of the support arm and/or the shifting of the gearbox for this purpose can occur successively and/or at least partially simultaneously or synchronously.

Notwithstanding the complexity of the required sequences of motions and/or the large number of required adjustment operations to be handled when transferring the aggregate from the field configuration to the transport configuration, the aggregate can thus be transferred from the field configuration to the transport configuration both from the retracted and from the extended sliding position in a manner that is operationally safe and/or very easy for the operator.

For this purpose, the work implement comprises a control device that is configured to control the adjustment of the support arm and/or the gearbox. In principle, the control can be completely mechanical, wherein, for example, for control purposes, one or a plurality of link arrangements is/are used as the control device. Alternatively or additionally, it is, however, preferred that the control is electrical, at least at times or in certain areas. It is particularly preferred that the adjustment of the aggregate from the field configuration to the transport configuration is fully automated.

It is preferable that, for folding the support arm, for telescoping the support arm and/or for shifting the gearbox, the agricultural work implement respectively comprises at least one actuator, in particular a linear actuator, wherein the control device is configured to adjust the actuators. For this purpose, the control device preferably comprises an electrical control unit, in particular a controller. For this purpose, by way of example, motors, in particular linear motors, hydraulic cylinders or electrohydraulic cylinders, can be used as actuators. The actuators can either be actuated independently of one another for folding the support arm, for telescoping the support arm and/or for shifting the gearbox, or they can at least partially be interconnected for simultaneous actuation. They allow for an adjustment of the aggregate and/or the gearbox relative to the attachment frame.

In a particularly preferred embodiment, which also solves the task, the control device has at least one measuring device that is configured to sense the current position of the support arm and/or the current position of the gearbox. Preferably, the work implement comprises at least one measuring device for sensing an angle of rotation of the support arm relative to the flat position or relative to the erect folding position, and for sensing a length of the support arm relative to the retracted sliding position in order to determine the current position of the support arm, as well as a measuring device for sensing the shift position of the gearbox relative to the home position. Preferably, conventional sensors are used as measuring devices. The control device is preferably configured to record the measurement values measured by the sensors and to control the actuators as a function of the measurement values.

In this embodiment, the control device is configured to carry out the adjustment of the aggregate from the field configuration to the transport configuration and/or of the gearbox from the home position to the shift position as a function of the recorded settings and/or positions. Since the control device is configured to carry out the adjustment of the aggregate and/or the gearbox as a function of the detected settings and/or positions, it can carry out the adjustment operations of the support arm and/or the gearbox in a controlled and/or monitored manner. In particular, this can ensure that the output shaft is not compressed or lengthened in an inadmissible manner during telescoping due to the adjustment operations of the aggregate and/or the gearbox. This reliably prevents damage to the output shaft. In this embodiment, too, notwithstanding the large achievable working width of the work implement and the associated complexity of the required sequences of movements and/or the large number of required adjustment operations, the aggregate can therefore be transferred from the field configuration to the transport configuration in a manner that is operationally safe and/or very easy for the operator, and this both starting from the retracted as well as starting from the extended sliding position. In doing this, complete automation of the adjustment operations is preferred.

Preferably, the support arm can therefore only be folded into the erect folding position when the sliding position is predominantly retracted, and/or can only be retracted into the retracted sliding position when the folding position is predominantly erect, when the gearbox is shifted into the shift position. The term “predominantly” means here that the support arm has a length that is less than or equal to a limit length when the sliding position is predominantly retracted, and/or that the support arm has a pivot angle that is greater than a limit angle when the folding position is predominantly erect. In this, the limit angle is the pivot angle that the support arm assumes relative to the flat position.

Shifting the gearbox from the home position to the shift position lengthens the output shaft before it is reduced or compensated for by pivoting and/or shifting the support arm. This ensures that the output shaft is not damaged by inadmissible lengthening or compression when the support arm is folded and/or retracted. It is moreover thereby ensured that the output shaft does not drop below a minimum length when setting up road operation. Consequently, the output shaft can be configured with a large minimum length. As a result, a large maximum length of the output shaft and, thus, a very large working width of the work implement can be realized, in particular also extending beyond a conventional working width. At the same time, a transport height and/or transport width of the work implement that complies with legal requirements is ensured. Moreover, a length ratio formed by the minimum length and the maximum length of the output shaft can be advantageously configured such that the work implement can be realized in a cost-effective and robust manner.

To set up road operation, the control device is further preferably configured to control that the gearbox: first shifts from the home position to the shift position when a length of the support arm is less than or equal to the limit length, in particular, the support arm is shifted to the retracted sliding position, or first shifts from the home position to the shift position, if the length of the support arm is greater than the limit length and a pivot angle of the support arm, relative to the flat position, is greater than a limit angle, in particular, the support arm is pivoted into the erect folding position, or shifts from the home position to the shift position, whereas the support arm, in particular starting from the flat position, is pivoted to the erect folding position, if the length of the support arm is greater than the limit length and the pivot angle of the support arm is smaller than or equal to the limit angle.

By optimizing the limit length for the length of the support arm and/or the limit angle for the swing angle of the support arm, it is possible to optimize the setting up of the road operation in terms of time spent and/or operational safety. By shifting the gearbox from the home position to the shift position while the support arm is pivoted to the erect folding position, the setting up of road operation is very quickly possible. In so doing, it is particularly preferred that the gearbox is in the shift position when the support arm is telescoped to the retracted slide position from a sliding position, in which it is still at least partially extended.

The control device is preferably further adapted to switch the gearbox from an in-service mode to an out-of-service mode. In the out-of-service mode, the drive shaft and the pinion shaft or shafts of the gearbox are mechanically decoupled from each other [is that true?]. As a result, the aggregate is drivingly connected to the power take-off in in-service mode, whereas it is drivingly disconnected from the power take-off in out-of-service mode. The aggregate is, therefore, not driven in the out-of-service mode.

Preferably, switching from in-service mode to the out-of-service mode is done by manual set up of the operator, for example, by means of a button. Moreover, the out-of-service mode can be switched on automatically by the control device when setting up road operation. It is then preferred that switching from an in-service mode to an out-of-service mode takes place when the support arm is folded into an intermediate position relative to the flat position, in particular into a headland position or higher. In this, the setting up of road operation can also be accomplished at the push of a button by the operator. In this context, it is particularly preferred that the control device is configured to carry out the setting up of road operation only in the out-of-service mode. This avoids any risk to persons found in the vicinity of the work implement.

The work implement also preferably has a telescopic input shaft, which input shaft is arranged between the gearbox and the power take-off shaft of the towing vehicle. The input shaft is preferably connected to the gearbox by means of universal joints. Alternatively or additionally, the work implement may have a disconnect coupling that connects the power take-off shaft to the gearbox in the home position of the gearbox and disconnects the power take-off shaft from the gearbox in the shift position of the gearbox. As a result, shifting to the out-of-service mode can be performed mechanically. In an advantageous embodiment, the disconnect coupling may be arranged between the input shaft and the gearbox.

Also, preferably, the attachment frame comprises a guide means for reversibly shifting the gearbox, which extends in the shift direction, in particular in the direction of travel. The gearbox can be shifted back and forth along the guide means. This allows the gearbox to be shifted in an operationally secure manner. One or more struts or rails can, for example, be used as guide means. The gearbox can be shifted along or shifted with these. In principle, it is also conceivable that the gearbox can be pivoted, or pivoted and shifted.

In a preferred embodiment, the work implement comprises two aggregates. These are preferably arranged on both sides of the attachment frame. For each of the aggregates, the work implement comprises one output shaft that is arranged between the gearbox and the aggregate to transmit power. The two aggregates are preferably arranged in a mirror image with respect to a center plane, which center plane is spanned by a line extending in the direction of travel and by a line extending in an upward direction. As a result, the gearbox is substantially centered between the two aggregates. Identical output shafts can then be used.

In a first preferred embodiment, the aggregates can be adjusted independently of each other. This means, for example, that one aggregate can be arranged in the folding position, whereas the other is in the flat position. It is, however, particularly preferred that the control device is at least additionally configured to change the position of both aggregates simultaneously in order to set up road operation.

The task is further solved with a method for setting up a road operation of an agricultural work implement, in particular of such an agricultural work implement, in which a position of an aggregate, which aggregate is hinged to the work implement via a telescopic support arm, is adjusted by pivoting and/or shifting the support arm, such that the aggregate reversibly pivots from a field configuration provided for field operation, in which the support arm is pivoted into a flat position that is approximately parallel to the ground, and is reversibly telescopic from a retracted sliding position into an extended sliding position, into a transport configuration provided for road operation, in which the support arm is pivoted into a folding position which is erect with respect to the flat position and is transferred into the retracted sliding position, wherein during the transfer of the aggregate from the field configuration into the transport configuration, the telescoping and/or pivoting of the support arm and/or the shifting of the gearbox takes place in different sequences as a function of current positions of the support arm and/or current positions of the gearbox. The support arm and/or the gearbox are adjusted in a different sequence, as a function of the current position of the support arm, which is to say, in particular, in a flat position or a folding position or an intermediate position between the flat position and the folding position, and/or a retracted position or an extended position or an intermediate position between the retracted and the extended position, by way of example, a headland position, and/or as a function of the current position of the gearbox, which is to say, in particular in the home position or the shift position or possibly an intermediate position between the home position and the shift position. To set up road operation, the telescoping and/or pivoting of the support arm and/or the shifting of the gearbox for this purpose can be carried out at least partially in succession and/or at least partially simultaneously or synchronously.

Notwithstanding the complexity of the required sequences of motions and/or the large number of required adjustment operations to be carried out when transferring the aggregate from the field configuration to the transport configuration, the aggregate can thus be transferred from the field configuration to the transport configuration both from the retracted and from the extended sliding position in a manner that is operationally safe and/or very easy for the operator.

In a preferred embodiment, which likewise solves the task, the work implement comprises an electrical control device, wherein the method comprises the steps of: shifting the gearbox from a home position in which it is drive-connectable or drive-connected with the aggregate, to a shift position, and detecting a current position of the aggregate and a current position of the gearbox, wherein the adjustment of the aggregate from the field configuration into the transport configuration, and/or of the gearbox from the home position into the shift position is carried out as a function of the detected positions of the support arm and/or positions of the gearbox. Since the adjustment of the aggregate and/or the gearbox is carried out as a function of the detected positions and/or positions, the adjustment operations of the aggregate and/or the gearbox can be carried out automatically and in a controlled manner. Any shortening or lengthening of the output shaft due to the adjustment of the aggregate and/or the gearbox can be at least partially compensated, in particular, to avoid inadmissible compression and/or lengthening of the output shaft.

In a preferred embodiment, in the case of a predominantly retracted sliding position, the support arm is first folded into the erect folding position, and/or in the case of a predominantly erect folding position, is first retracted into the retracted sliding position, once the gearbox has been shifted into the shift position. By shifting the gearbox from the home position to the shift position, the output shaft is lengthened before it is reduced by pivoting and/or shifting the support arm. This ensures that the output shaft is not damaged by inadmissible lengthening or compression when the support arm is folded and/or retracted.

Preferably, the telescoping and/or folding of the support arm and/or the shifting of the gearbox takes place in a sequence, in particular one after the other and/or at least partially simultaneously, which is dependent on the detected settings and/or positions. In particular, the sequence in which the telescoping and/or folding of the support arm and/or the shifting of the gearbox takes place can be optimized. By selection of the sequence, this makes for the possibility of a change, that is not only a very fast change but also a very reliable change, which is to say, operationally safe, from field operation to road operation.

The method ensures that the length of the output shaft does not fall below a minimum length and/or does not exceed a maximum length when setting up road operation. As a result, the output shaft can be configured with a ratio of minimum length to maximum length that is favorable for robustness and for procurement costs. The method, therefore, makes it possible to realize a very large working width with cost-effective technical means.

It is expressly pointed out that the above-described embodiments of the invention can be combined in each case individually, but also in any combinations with one another, with the subject matter of the main claim, provided that no technically compelling obstacles are in conflict therewith.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

Further modifications and embodiments of the invention can be derived from the following description of the subject matter and the drawings.

The invention is now to be explained in more detail with reference to exemplary embodiments.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

In the drawings:

FIG. 1(*b*), is a separate perspective view a drive train of the work implement;

FIG. 1(*c*) is a separate perspective view of a detail of an underside of the work implement;

FIG. 2 (*b*) shows schematically the work implement of FIG. 1, wherein an aggregate and/or a gearbox is/are shown in different settings and/or positions, with this being a second intermediate position for transferring the work implement to road operation;

FIG. 2 (*c*) shows schematically the work implement of FIG. 1, wherein an aggregate and/or a gearbox is/are shown in different settings and/or positions, with this being a third folded position for transferring the work implement to road operation;

FIG. 3 (*b*) shows a perspective view of a drive train of the work implement;

FIG. 3 (*c*) is a perspective view of a detail of an underside of the work implement.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1A:
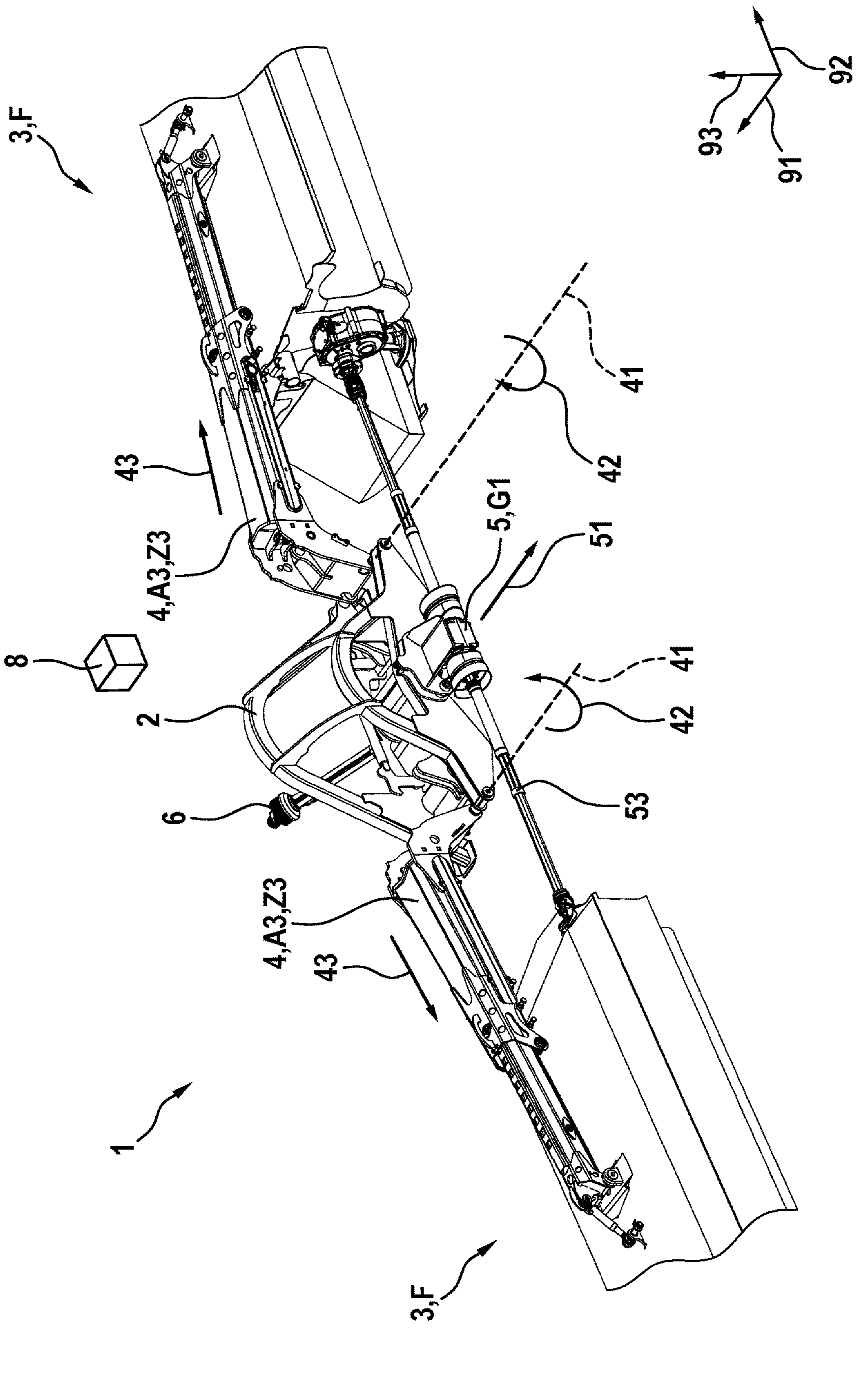
FIG. 1(*a*) shows schematically a perspective view of an embodiment of a work implement according to the invention and set up for field operation.
Figure 1B:
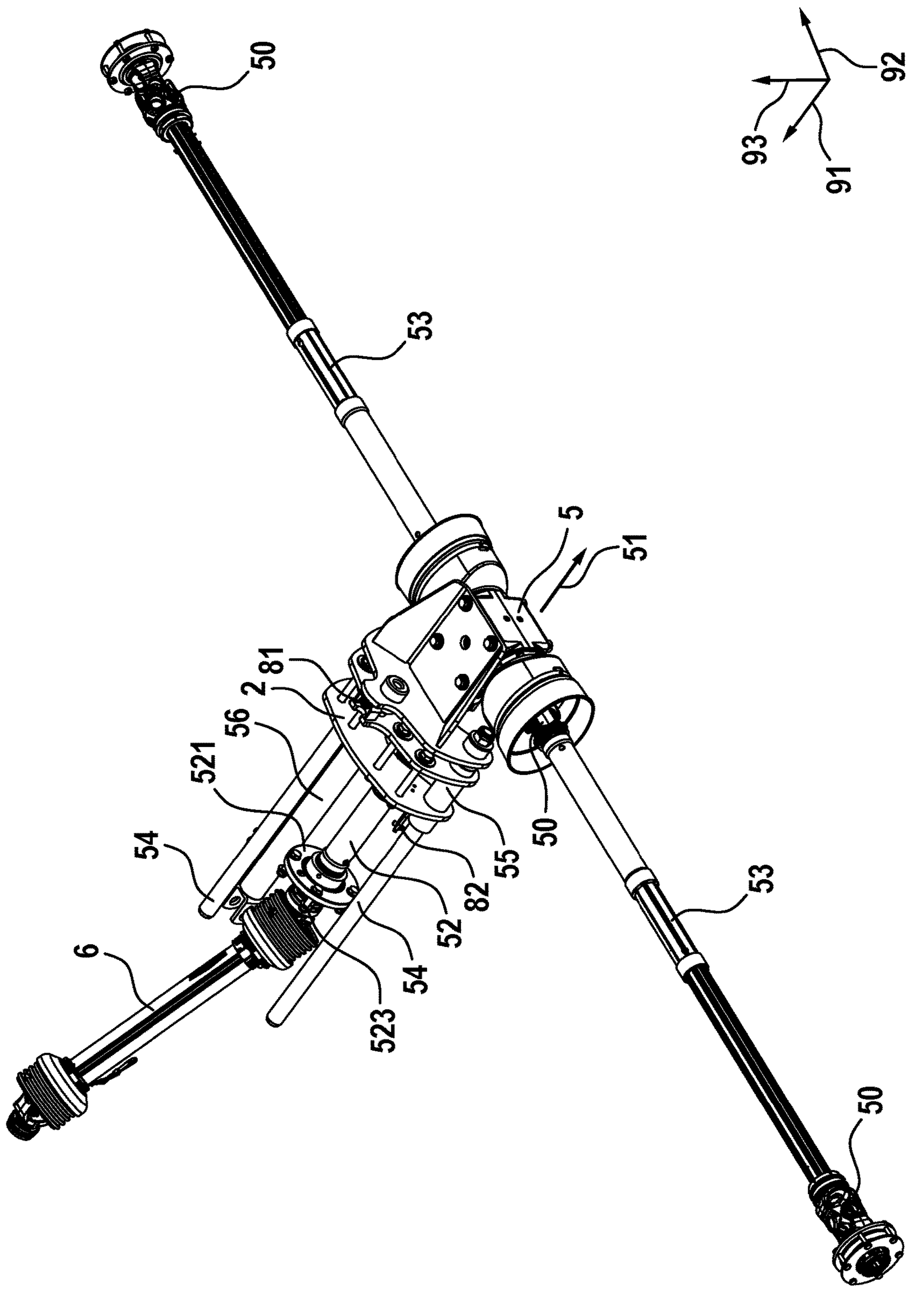
Figure 1C:
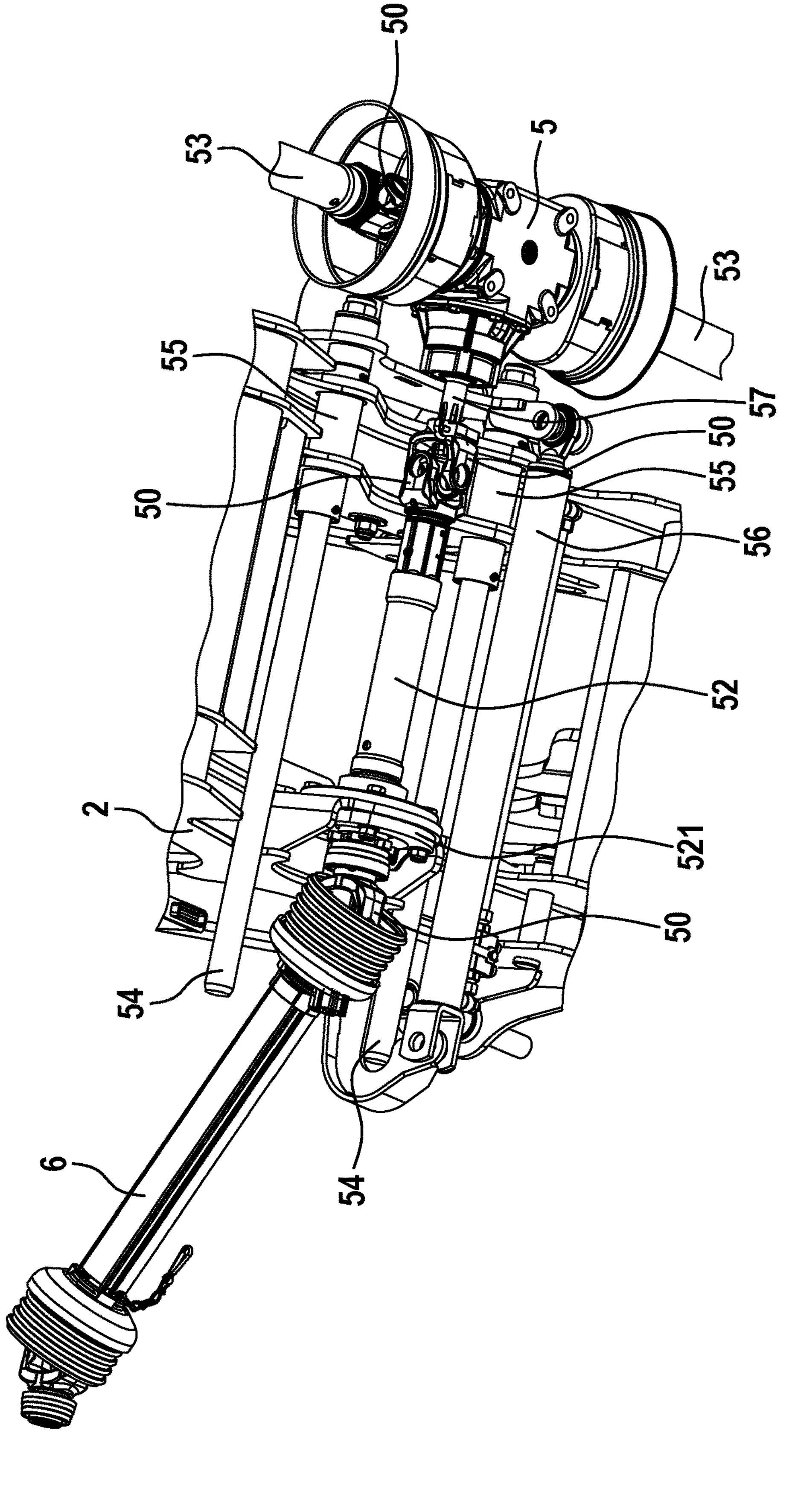

FIGS. 1 (*a*), 1 (*b*), and 1(*c*) show an agricultural work implement 1, which is configured here as a mowing machine. In the following, the terms work implement 1 and mowing machine are therefore used synonymously. However, the present invention is also applicable to other agricultural work implements 1, for example, to haymaking machines such as tedders or windrowers.

The work implement 1 has an attachment frame 2, which is provided for attachment to a towing vehicle (not shown), for example, a tractor or hauler or a self-propelled harvesting machine, such as, in particular, a forage harvester or a baler. The attachment frame 2 allows the agricultural work implement 1 to be attached to the towing vehicle, in particular to a lifting mechanism of the towing vehicle. In the attached state, it is carried by the towing vehicle. The present invention is, however, also applicable to other agricultural work implements that are towed by the towing vehicle and for this purpose are coupled to the towing vehicle, for example, via a drawbar.

The work implement 1 has an aggregate 3 attached to a support arm 4 on both sides of the attachment frame 2. The two aggregates 3 are arranged mirror-symmetrically to a center plane (not shown), which center plane is spanned by a line extending in a direction of travel 91 and a line extending in an upward direction 93. The following explanations apply to both aggregates 3, wherein they are initially described in the framework of FIG. 1 (*a*) on the basis of only one of the aggregates 3.

The support arm 4, on which the aggregate 3 is arranged, is hinged to the attachment frame 2 so as to be pivotable about a pivot axis 41. In addition, the support arm 4 is configured to be alterable in length in an extraction direction 43. For this purpose, it is configured to be telescopic and comprises, in particular, two sections that are shiftable into one another.

The support arm 4 can be telescopically shifted from a retracted sliding position Z1 to an extended sliding position Z3. In addition, it can be folded by pivoting in pivot direction 42 about pivot axis 41 from a flat position A3, in which it is arranged approximately parallel to the ground, into an erect folding position A1, in which it extends approximately in the upward direction 93, or at a (small) acute angle to the latter.

In the flat position A3 of the aggregate 3, the support arm 4 extends substantially in a longitudinal direction 92, which is arranged transversely to the direction of travel 91 and transversely to the vertical upward direction 93. On flat terrain, it is therefore oriented approximately horizontally or, in any case, extends only at a (small) acute angle to the horizontal. The aggregate 3 in flat position A3 is, therefore, also aligned approximately parallel to the ground.

A position of the aggregate 3 is changeable by pivoting and/or telescoping the support arm 4.

The aggregate 3 is schematically shown in FIG. 1 (*a*) in a field configuration F intended for field operation. For the sake of clarity, only a detail of the aggregate 3 is shown in FIG. 1 (*a*).

In the field configuration F of the aggregate 3, the support arm 4 is pivoted into the flat position A3 and is reversibly shiftable from the retracted sliding position Z1 into the extended sliding position Z3. The aggregate 3 is then cantilevered to the side. In the flat position A3 of the support arm 4, the aggregate is guided over the ground for cutting harvest material.

During telescoping of the support arm 4, the aggregate 3 is shifted in the extraction direction 43 towards the attachment frame 2 or shifted against the extraction direction 43 away from the attachment frame 2. By telescoping the support arm 4, a working width (not specified) of the work implement 1 can therefore be adjusted.

The extended sliding position Z1 refers to the position in which the support arm 4 is telescoped to a maximum length. The retracted sliding position Z3 refers to the position in which the support arm 4 is telescoped to a minimum length. Thus, the work implement 1 in the flat position A3 is advantageously adjustable from the minimum working width by telescoping the support arm 4 in the extraction direction 43 to the maximum working width and is resettable by telescoping against the extraction direction. In FIG. 1 (*a*), the support arm 4 is in the extended sliding position Z3, such that FIG. 1 (*a*) shows the work implement 1 at maximum working width.

FIG. 1 (*b*) shows a drive train of the work implement 1 in a view detached from the attachment frame 2. FIG. 1 (*c*) shows a detail of the work implement 1 with the drive train on an underside (not indicated) of the attachment frame 2.

To drive the aggregate 3, the work implement 1 comprises a drive train comprising a gearbox 5 that can be connected to a power take-off shaft (not shown) of the towing vehicle in a power-receiving manner. The gearbox 5 is provided for transmitting power to the aggregates 3 and is arranged substantially centrally between the aggregates 3 on a side (not shown) of the attachment frame 2 facing away from the towing vehicle.

To connect the drive train to the power take-off shaft, the work implement 1 comprises a connection shaft 6. An input shaft 52, which is configured to be telescopic, connects the connection shaft 6 to the gearbox 5. For this purpose, the gearbox 5 comprises a drive shaft 57 to which the input shaft 52 is connected. On the output side of the gearbox 5, the drive train comprises one output shaft 53 for each of the aggregates 3, which output shaft is connected to the respective aggregate 3 such that the aggregate can be driven via the output shaft 53. In the present embodiment of the work implement 1, the drive train has two output shafts 53 to drive the two aggregates 3. In order to be able to telescope the support arm 4, the output shafts 53 are telescopic. In a home position G1 of the gearbox 5, the output shafts 53 extend substantially in or against the longitudinal direction 92, and, therefore, substantially transverse to the direction of travel 91. For this purpose, the gearbox 5 is configured here as a T-gearbox, in which the output shafts 53 are connected to the gearbox 5 transversely to the input shaft 52. The output shafts 53 are respectively connected to pinion shafts (not shown) of the gearbox 5. The connections of the shafts 6, 52, 57, and 53 of the drive train are respectively formed by universal joints (not shown). The universal joints are provided for angular compensation between shafts 6, 52, 57, and 53.

When the drive train is connected to the power take-off shaft, the connection shaft 6 and the input shaft 52 are rotated when the power take-off shaft is driven, and the gearbox 5 is therefore driven. The output shafts 53 thereby also rotate such that the aggregates 3 are driven in an in-service mode of the gearbox 5. The gearbox 5 is switchable to an out-of-service mode in which the drive shaft 57 and the pinion shafts of the gearbox 5 are decoupled from each other such that the pinion shafts are not driven when the drive shaft 57 is driven. Instead of such a switchable gearbox 5, it is also preferred to provide a disconnect coupling (not shown) in the driveline to decouple the output shaft 53 from the power take-off shaft, in particular in the area of the input shaft 52.

In field operation, the gearbox 5 is arranged in the home position G1, in which it is provided to drive the aggregate 3. It can manually be reversibly switched from in-service mode to out-of-service mode. In addition, the work implement 1 is configured to switch the gearbox 5 to the out-of-service mode when the support arm 4 is folded up from the flat position A3 to the erect folding position A1, if it exceeds an intermediate position A2, in particular, a headland position.

In order to be able to transport the work implement 1 on the road, the aggregates 3 are adjustable from the field configuration F to a transport configuration T. To ensure that the work implement 1 does not exceed the permissible width of vehicles on the road, the support arm 4 is folded into the erect folding position A1 in the transport configuration T of the aggregate 3. In the extended sliding position Z3 and the erect folding position A1 of the support arm 4, the work implement 1 moreover exceeds the permissible height of vehicles on the road. To ensure that the work implement 1 does not exceed the permissible height, the support arm 4 is retracted in the transport configuration T of the aggregate 3. Since the pivot axis 41 of the support arm 4 is offset from the universal joints 50 of the output shaft 53, a compensation of the length of the output shaft 53 must take place for folding up and/or retracting, which can lead to inadmissible compression or lengthening of the output shaft 53.

In order to prevent this, for setting up road operation, the gearbox 5 is reversibly shiftable relative to the attachment frame 2 in a shift direction 51 to a shift position G2. FIG. 1 (*c*) shows the driveline with the gearbox 5 shifted slightly in shift direction 51 relative to home position G1. In this illustration, the gearbox 5, therefore, has not yet reached shift position G2.

The input shaft 52 is rotatably mounted in a stationary bearing 521 on the attachment frame 2 at its end opposite the gearbox 5.

When the gearbox 5 is shifted from the home position G1 to the shift position G2, the input shaft 52 is lengthened by telescoping in the shift direction 51, and when the gearbox 5 is shifted back from the shift position G2 against the shift direction 51 to the home position G1, it is shortened. In the home position G1, it is preferably retracted to its minimum intended length and provided for power transmission to the aggregate 3 via the gearbox 5 and the output shaft 53.

During shifting, the gearbox 5 is guided by guiding elements 54, which extend in the shift direction 51. For this purpose, the guiding elements 54 are configured as struts, each of which is shiftably mounted in a guide bearing 55. The guiding elements 54 are here fastened to the gearbox 5, and the guide bearing 55 to the attachment frame 2. However, an embodiment can also be used in which the guiding elements 54 are arranged on the attachment frame 2 and the guide bearing 55 on the gearbox 5.

An actuator 56 is provided for shifting the gearbox 5, which actuator is configured here as a hydraulic cylinder. Another actuator 56 can, however, also be used, such as a linear motor.

The actuator 56 is operated by an electrical control device 8, which is arranged in the attachment implement 1. In principle, an electrical control device 8 of the towing vehicle can also be used. The electrical control device 8 is also provided for switching the gearbox 5 from in-service mode to out-of-service mode.

By shifting the gearbox 5, an angle of the output shaft 53 respectively changes relative to the pinion shaft of the gearbox 5 to which they are connected. This angle change is possible due to the universal joint 50.

In order to be able to transfer the work implement 1 from field operation to road operation reliably, quickly and easily for the operator, the electrical control device 8 is configured to detect current positions A1 to A3, Z1 to Z3 of the support arm 4 and/or a current position G1, G2 of the gearbox 5. The electrical control device 8 is, moreover, configured to control the adjustment of the support arm 4 and/or the gearbox 5. When transferring the aggregate 3 from the field configuration F to the transport configuration T, the telescoping and/or pivoting of the support arm 4 and/or the adjustment of the gearbox 5 can take place in different sequences as a function of the detected positions A1, A2, A3, Z1, Z2, Z3 of the support arm 4 and/or the detected position G1, G2 of the gearbox 5. In this manner, this prevents, on the one hand, inadmissible compression or lengthening of the output shaft 53. The transfer can be carried out as quickly as possible and can also be automated, and therefore as simple as possible for the operator. For reasons of safety for persons in the vicinity of the work implement 1, the control device 8 can be configured to prevent the setting up of the road operation until the gearbox 5 has been switched to the out-of-service mode.

Once again, for adjusting the aggregate 3, the work implement 1 comprises actuators (not shown) which are controllable by the electrical control device 8. Moreover, it comprises sensors 81, 82 for detecting the current positions A1 to A3, Z1 to Z3 of the support arm 4, and the position G1, G2 of the gearbox G.

A first sensor 81 is provided to detect the home position G1 of the gearbox 5. For this purpose, the first sensor 81 is arranged opposite the gearbox 5 on the attachment frame 2. By way of example, it can be configured as a proximity sensor and can, for example, inductively or magnetically detect the approach of the gearbox 5 to the attachment frame 2. A second sensor 82 is arranged on one of the guide bearings 55 and is provided for detecting the shift position G2 of the gearbox 5. This second sensor 82 too can be configured as a proximity sensor for this purpose and, for example, inductively or magnetically detect whether or not the guiding element 54 is arranged in its proximity range.

The current position A1, A2, Z1, Z2 of the support arm 4 can be detected, for example, by means of the shifting paths of the respective actuators, and/or by means of further sensors (not shown).

Figure 2A:
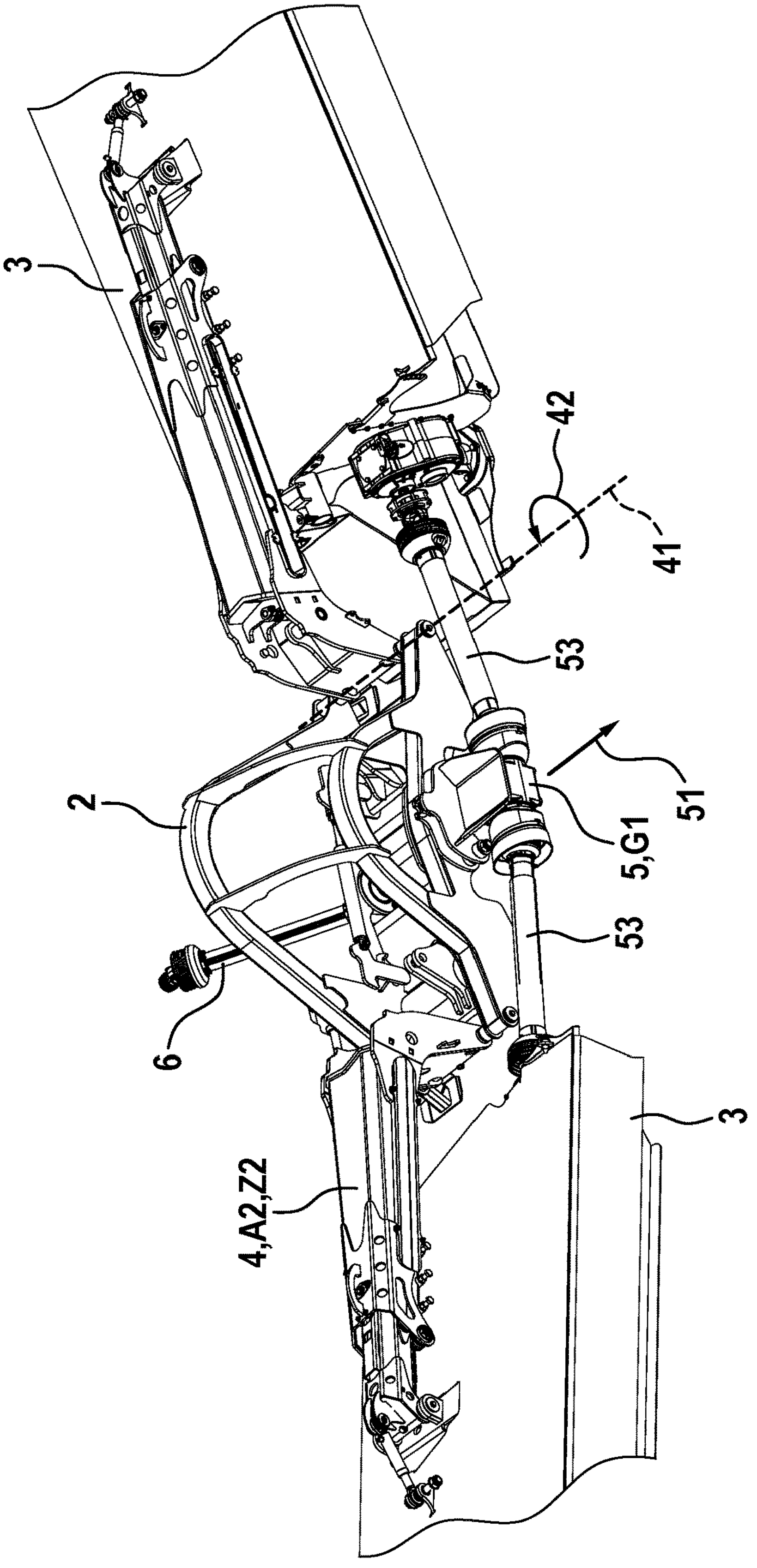
FIG. 2 (*a*) shows schematically the work implement of FIG. 1, wherein an aggregate and/or a gearbox is/are shown in different settings and/or positions, with this being a first flat position for transferring the work implement to road operation.
Figure 2B:
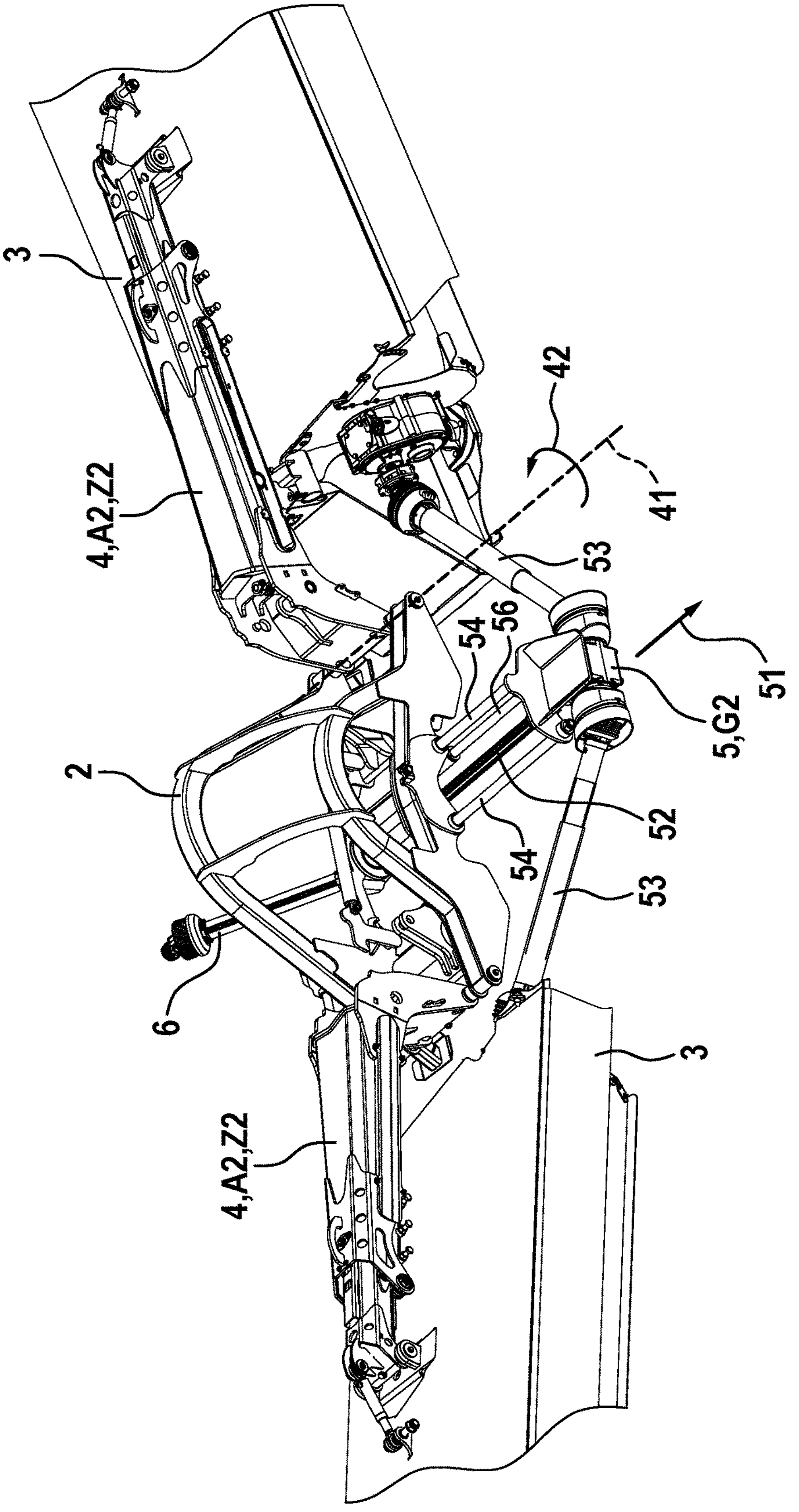
Figure 2C:
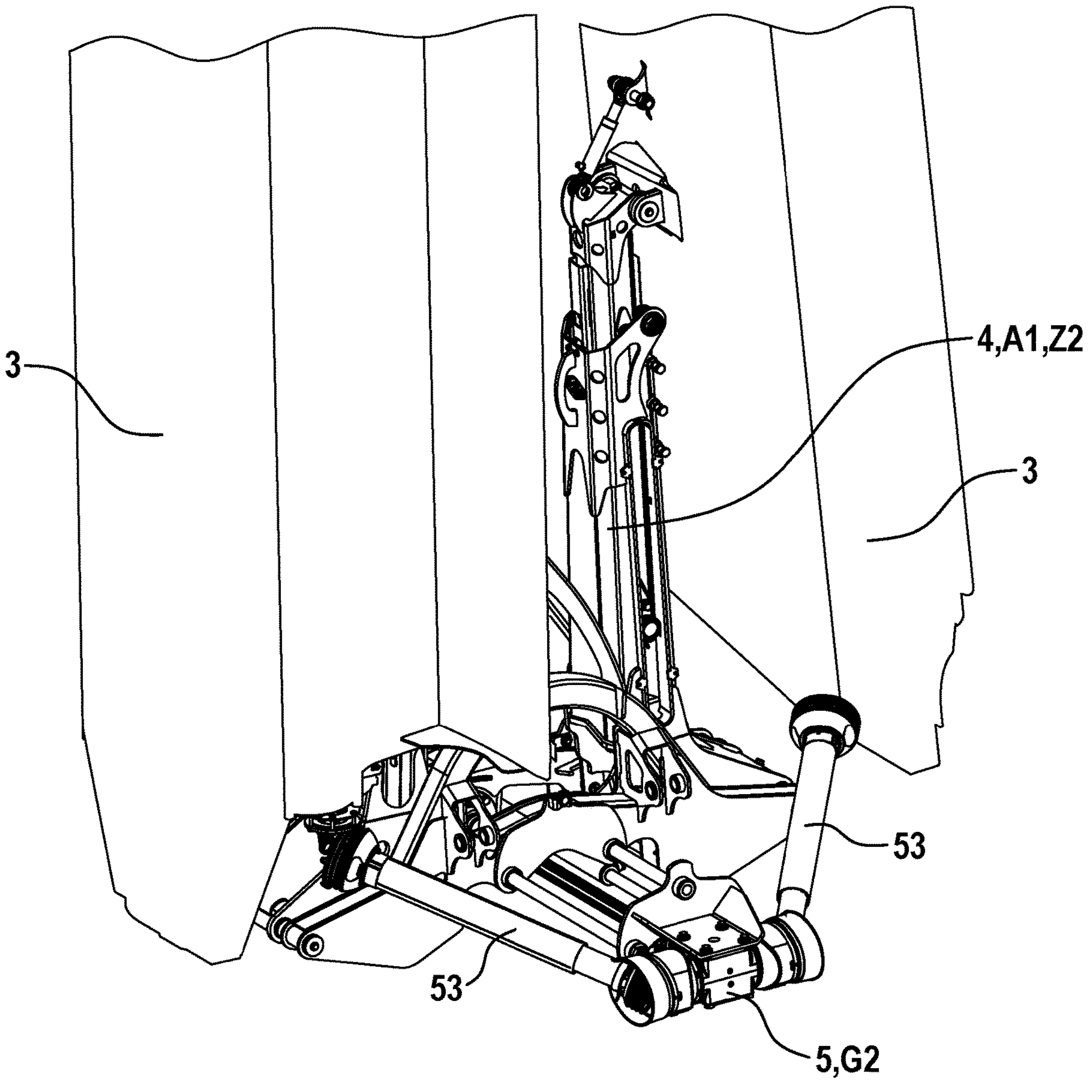
Figure 3A:
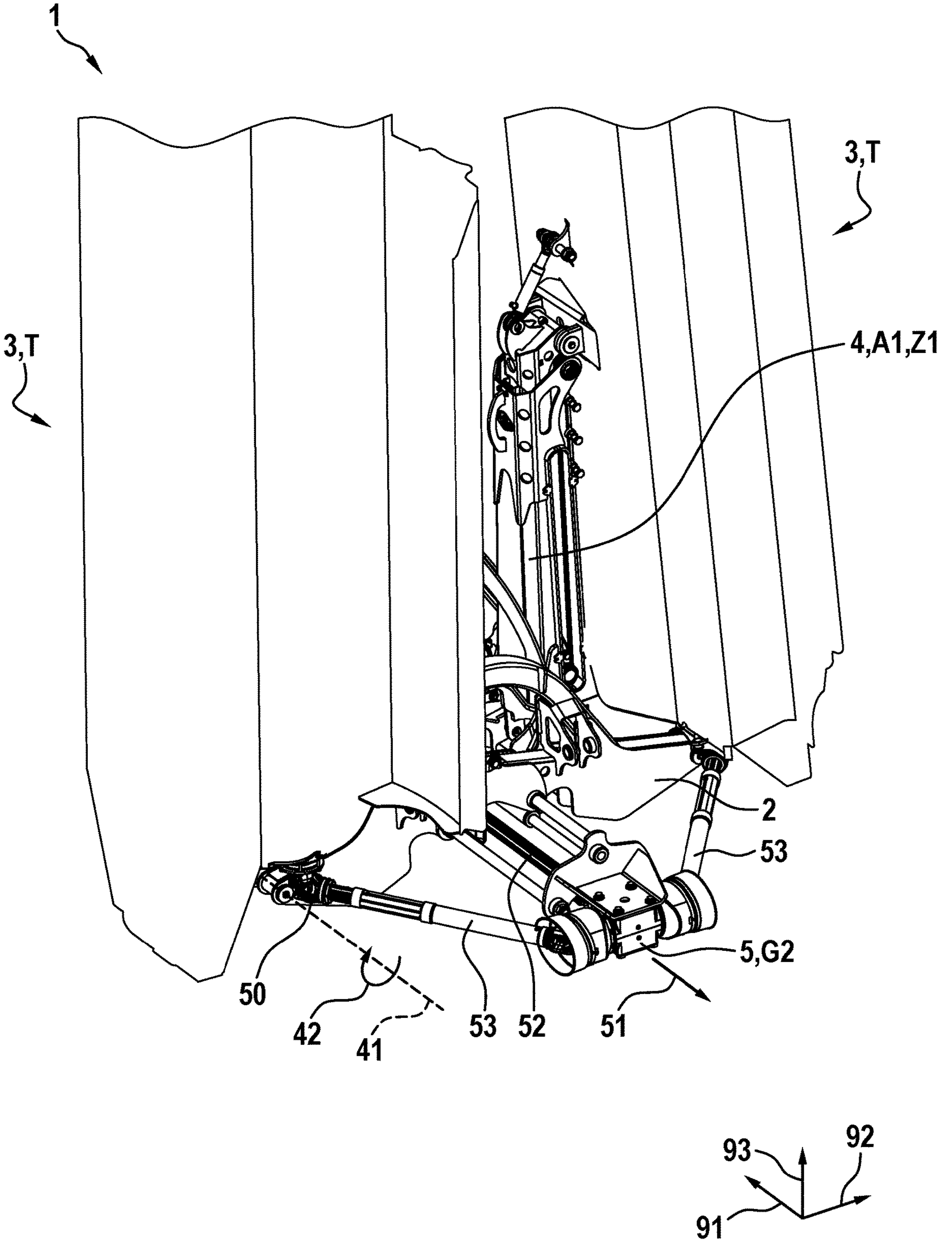
FIG. 3 (*a*) shows schematically a perspective view of the work implement of FIG. 1 set up for road operation.
Figure 3B:
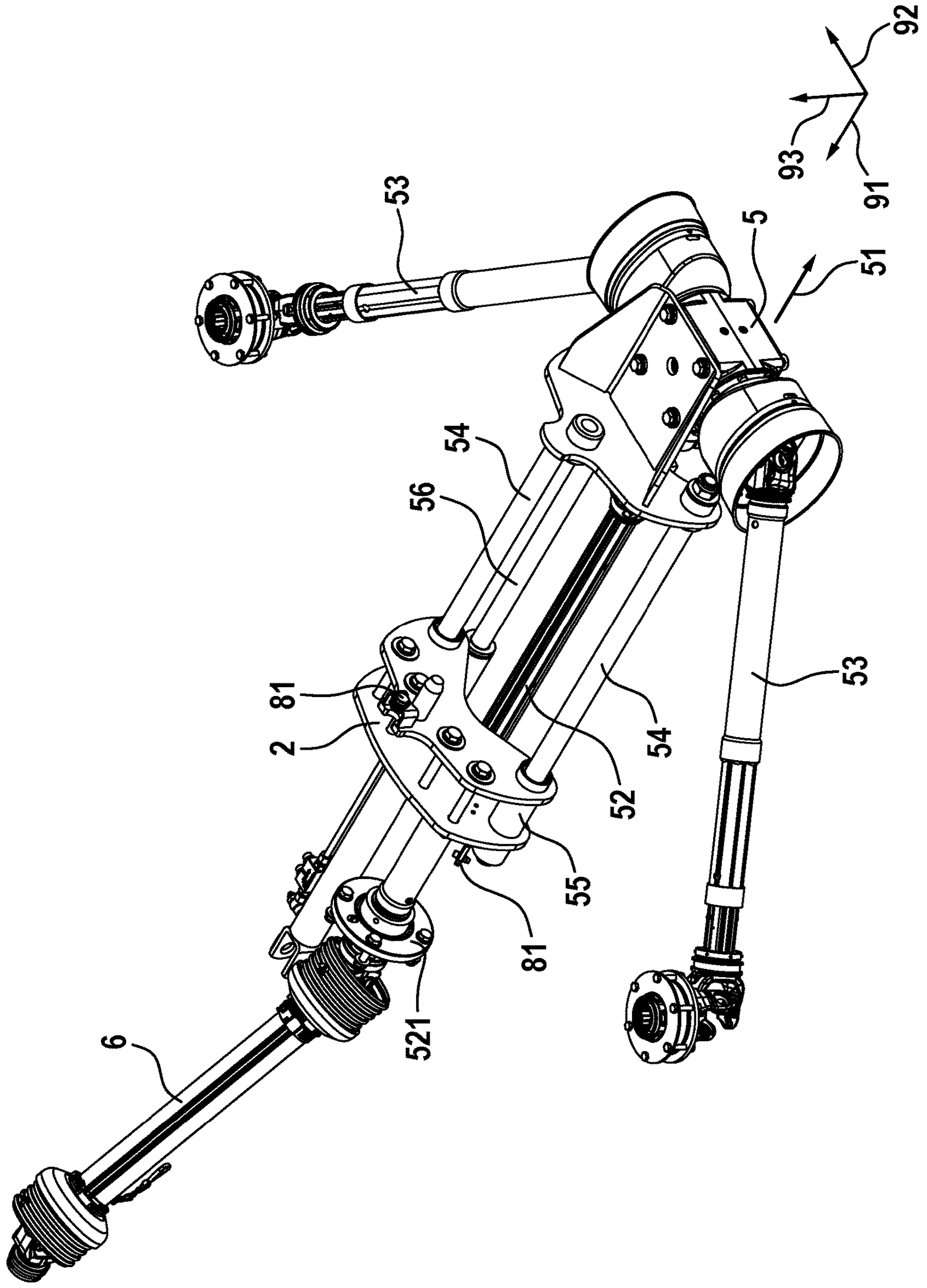
Figure 3C:
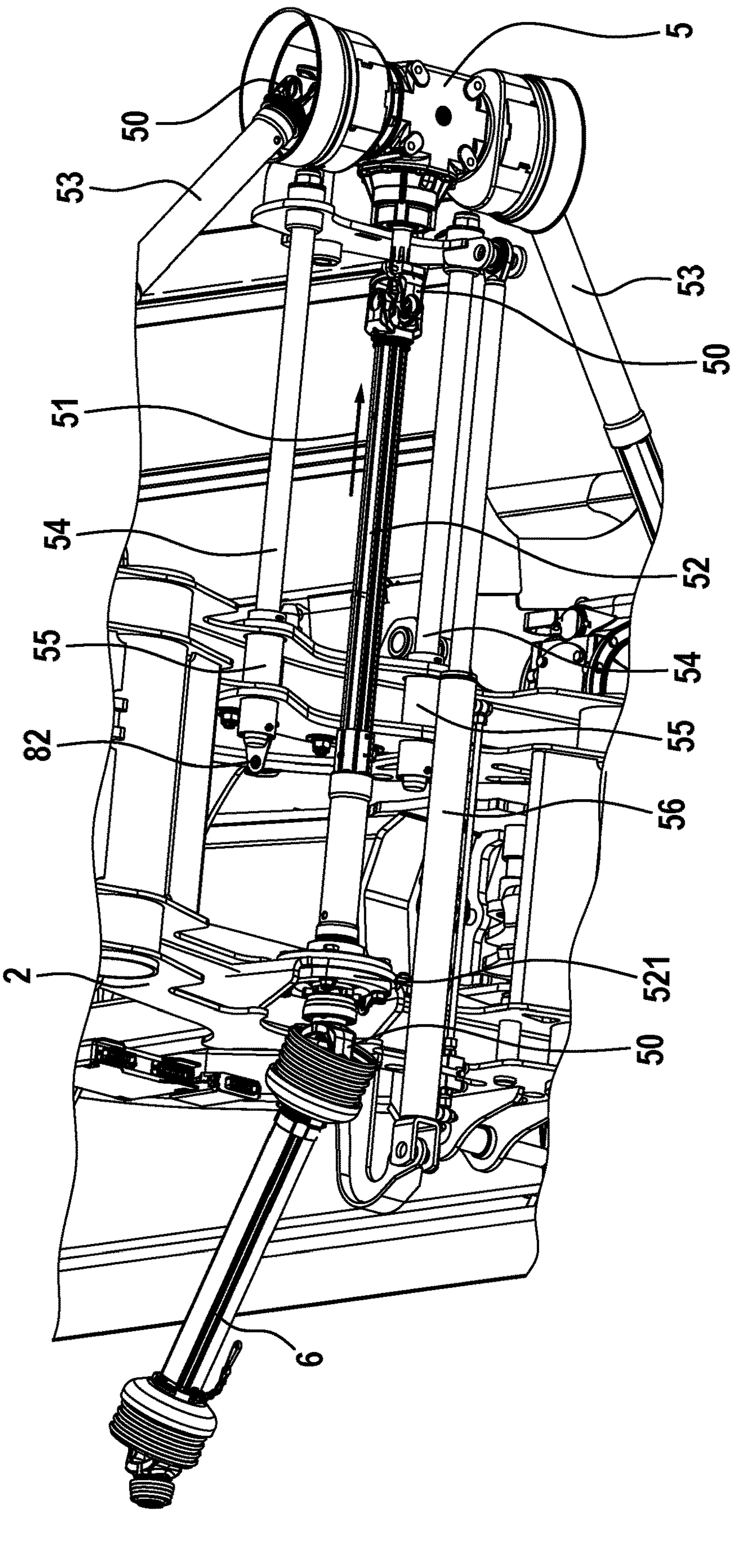

Starting from the work implement 1 shown in FIG. 1 (*a*) to FIG. 1 (*c*), which is in field operation, FIG. 2 (*a*) to FIG. 2 (*c*) show adjustment operations in a possible sequence for transferring the work implement 1 to road operation. FIG. 3 (*a*) shows the work implement 1 in road operation.

FIG. 2 shows the work implement 1 from FIG. 1, with the aggregate 3 raised to an intermediate position A2, here, in particular, a headland position. The headland position V enables contactless guidance of the aggregate 3 over the ground in the headland and/or when driving into the crop. For this purpose, the support arm 4 is pivoted upward relative to the flat position A3. In so doing, it is arranged between the flat position A3 and the folding position A1. In this intermediate position A2, the gearbox 5 is switched to the out-of-service mode such that the aggregate 3 is no longer driven.

In addition, the support arm 4 is here already at least partially retracted from the extended sliding position Z1 into an intermediate position Z2. It is thus positioned between the extended sliding position Z3 and the retracted sliding position Z1. The work implement 1 is thereby, as before, in a configuration that is usual for field operation.

The intermediate positions A2, Z2 are selected here in such a way that the output shaft 53 is shortened to a minimum length. To avoid a compression of the output shaft 53, the gearbox 5 is shifted in a next step to the shift position G2. FIG. 2 (*b*) shows the work implement 1 with gearbox 5 shifted to shift position G2.

It is visible that the output shaft 53 is lengthened by adjusting the gearbox 5. In so doing, a compression of the output shaft 53 when the support arm 4 is folded up and/or shifted in further can reliably be avoided.

Since the gearbox 5 is arranged here in shift position G2, the sequence in which the support arm 4 is subsequently adjusted is freely selectable. Starting from the intermediate positions A2, A3 shown in FIG. 2 (*b*), it can, therefore, first be folded up into the erect folding position A1 when the gearbox 5 is arranged in shift position G2. This is shown in FIG. 2 (*c*). Finally, the support arm 4 is retracted into the retracted sliding position Z1. The aggregate 3 is then in the transport configuration T, and the work implement 1 is set up for road operation. This is shown in FIG. 3 (*a*).

Alternatively, starting from the intermediate positions A2, A3 shown in FIG. 2 (*b*), the support arm 4 can also first be retracted into the retracted sliding position Z1 with the gearbox 5 arranged in shift position G2, and then folded up into the erect folding position A1.

Compared to the sequence shown here, the work implement 1 can also be transferred even more quickly from field operation to road operation if the support arm 4 is folded up and the gearbox 5 is shifted in an at least partially simultaneous manner. For this to happen, a length of the support arm 4 must be greater than a limit length, and a pivoting angle of the support arm 4 relative to the flat position A3 must be less than or equal to a limit angle.

To set up road operation, the support arm 4 can be pivoted and/or telescoped further from the intermediate positions A2, Z3, in particular until the aggregate 3 is adjusted in the transport configuration T (see FIG. 2). This prevents damage to the output shaft 53 due to buckling and/or compression.

The electrical control device 8 is configured to select the optimum sequence based on the detected positions A1 to A3, Z1 to Z3 of the support arm 4, and the detected position G1, G2 of the gearbox 5 and to control the actuators 56 in this sequence.

FIG. 3 (*a*) shows the work implement 1 set up for road operation. FIG. 3 (*b*) shows the drive train of the work implement 1 set up for road operation, and FIG. 3 (*c*) shows a detail from below of the work implement 1 set up for road operation. For this purpose, the aggregate 3 is adjusted to transport configuration T and the gearbox 5 to shift position G2. In the transport configuration T, the aggregate 3 is erect such that it reaches more or less in the upward direction 93, or at a (small) acute angle thereto. The gearbox 5 is spaced from the attachment frame 2 in the shift position G2.

By shifting the gearbox 5 into the shift position G2, the output shafts 53 are lengthened relative to their minimum length. To do this, the actuator 56 is extended, and the input shaft 52 is telescoped to a length, in particular to the maximum length. In so doing, the guiding elements 54 are shifted in the guide bearings 55. As a result, the first sensor 81 can no longer detect a gearbox 5, and the second sensor 82 can no longer detect a guiding element 54. The electrical control device 8 uses the signal from the second sensor 82 to determine that the gearbox has shifted to the shift position G2.

Figure 4:
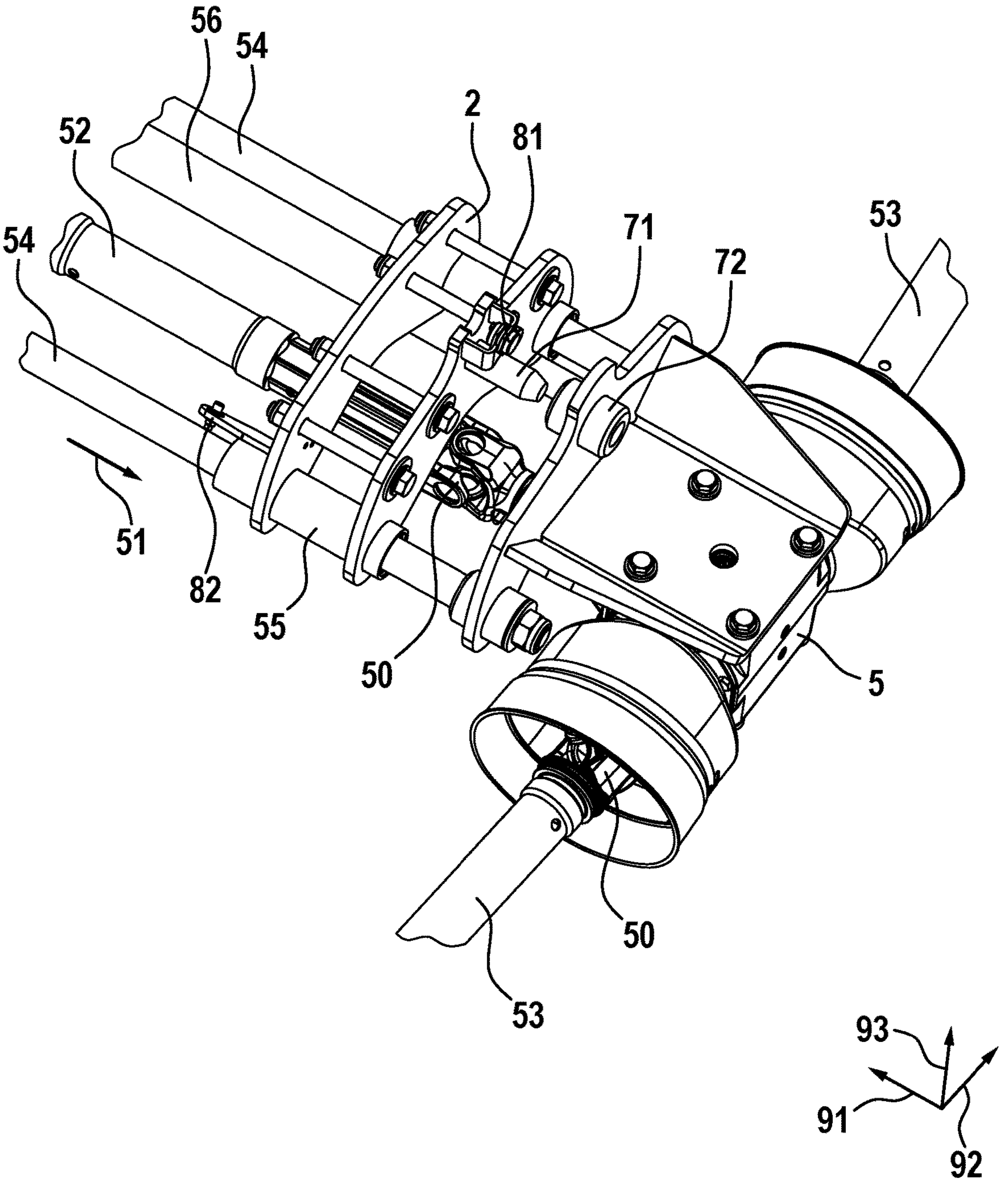
FIG. 4 shows an enlarged detail of the drive train of the work implement of FIG. 1.

FIG. 4 shows an enlarged detail of the drive train of the embodiment of FIG. 1 (*c*). Here, the gearbox 5 is arranged in a position in which it is at least partially adjusted away from the attachment frame 2. It is, therefore, in an intermediate position (not designated) between the home position G1 and the shift position G2. The actuator 56 provided for shifting the gearbox 5 is at least partially extended for this purpose.

The two guiding elements 54 arranged on the gearbox 5 are visible. They are shiftably arranged in the guide bearings 55 provided for guidance such that they can be shifted relative to the attachment frame 2, and they serve to guide the gearbox 5 in and/or against the shift direction 51.

In order to prevent the gearbox 5 from rotating together with the input shaft 52 when the input shaft rotates, coupling elements 71, 72 are provided on the attachment frame 2 and on the gearbox 5. A first coupling element 71 is configured as a pin, and a second coupling element 72 as a through hole. In the home position G1 of the gearbox 5, the pin 71 passes through the through hole 72. In so doing, the gearbox 5 can be supported on the attachment frame 2. When the gearbox 5 is shifted to the shift position G2, the pin 71 is pulled out of the through hole 72. However, the first sensor 81 of the control device 8 indicates the removal of the gearbox 5 such that the gearbox 5 can be switched, in good time, to the out-of-service mode by the control device 8.

The invention is not limited to the above-described exemplary embodiment. A person skilled in the art can modify the exemplary embodiment in a manner, which appears suitable by using the available specialist knowledge in order to adapt it to a specific application.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| List of Reference Characters | |
|---|---|
| 1 | Agricultural work implement |
| 2 | Attachment frame |
| 3 | Aggregate |
| 4 | Support arm |
| 5 | Gearbox |
| 6 | Connection shaft |
| 8 | Electrical control device |
| 41 | Pivot axis |
| 42 | Pivot direction |
| 43 | Extraction direction |
| 50 | Universal joint(s) |
| 51 | Shift direction |
| 52 | Input shaft |
| 53 | Output shaft(s) |
| 54 | Guiding elements |
| 55 | Guide bearing(s) |
| 56 | Actuator |
| 57 | Drive shaft |
| 71 | First coupling element |
| 72 | Second coupling element |
| 81 | First sensor |
| 82 | Second sensor |
| 91 | Direction of travel |
| 92 | Longitudinal direction |
| 93 | Upward direction |
| 521 | Stationary bearing |
| A1 | Folding position |
| A2 | Intermediate position |
| A3 | Flat position |
| F | Field configuration |
| G1 | Home position |
| G2 | Shift position |
| T | Transport configuration |
| V | Headland position |
| Z1 | Retracted sliding position |
| Z2 | Intermediate position |
| Z3 | Extended sliding position |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein, refers to slight variations in numerical quantities with respect to any quantifiable variable. Inadvertent error can occur, for example, through the use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes a structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The invention claimed is:

1. An agricultural work implement (1) for attachment to a towing vehicle, comprising an attachment frame (2), on which a telescopic support arm (4) is pivotably and/or shiftably arranged;

at least one aggregate (3) hinged to the support arm (4);

a gearbox (5) capable of receiving power from the towing vehicle; and a variable-length output shaft (53), which is arranged in a power-transmitting manner between the gearbox (5) and the aggregate (3), wherein the aggregate (3) is positionally changeable by pivoting and/or shifting the support arm (4), and is reversibly adjustable from a field configuration (F) provided for field operation, in which the support arm (4) is pivoted into a flat position (A3) that is approximately parallel to the ground, and reversibly telescopic from a retracted sliding position (Z1) into an extended sliding position (Z3), into a transport configuration (T) provided for road operation, in which the support arm (4) is pivoted into a folding position (A1) that is erect with respect to the flat position (A3), and is shifted into the retracted sliding position (Z1), wherein the gearbox (5) is adjustable from a home position (G1), in which it is drive-connectable or drive-connected to the aggregate (3), into a shift position (G2) for setting up road operation, characterized in that an electronic control device (8) is provided which is configured to detect the current positions (A1, A2, A3, Z1, Z2, Z3) of the support arm (4) and/or one current position (G1, G2) of the gearbox (5), such that when the aggregate (3) is transferred from the field configuration (F) to the transport configuration (T), the telescoping and/or pivoting of the support arm (4) and the adjustment of the gearbox (5) from the home position (G1) into the shift position (G2) takes place in different sequences as a function of the current positions (A1, A2, A3, Z1, Z2, Z3) of the support arm (4) and/or one current position (G1, G2) of the gearbox (5);

wherein the electronic control device (8), to set up road operation, is configured to control the gearbox(S) to;

first shift from the home position (G1) to the shift position (G2) when a length of the support arm (4) is less than or equal to a limit length; or first shift from the home position (G1) to the shift position (G2), if the length of the support arm (4) is greater than the limit length and a pivot angle of the support arm (4) is greater than a limit angle; or shift from the home position (G1) to the shift position (G2), whereas the support arm (4) is pivoted Into the erect folding position (A1), if the length of the support arm (4) is greater than the limit length and the pivot angle of the support arm (4) is smaller than or equal to the limit angle.

2. The agricultural work implement (1) according to claim 1, wherein the electronic control device (8) is adapted to mechanically and/or electrically control the adjustment of the support arm (4) and/or the gearbox (5).

3. The agricultural work implement (1) according to claim 2, wherein the electronic control device (8) includes at least one measuring device (81, 82) that is configured to sense the current position (A1, A2, A3, Z1, Z2, Z3) of the support arm (4) and/or the current position (G1, G2) of the gearbox (5), and is configured to carry out the adjustment of the aggregate (3) from the field configuration (F) to the transport configuration (T) and/or of the gearbox (5) from the home position (G1) to the shift position (G2) as a function of the recorded positions (A1, A2, A3, Z1, Z2, Z3) and/or home or shift position (G1, G2).

4. The agricultural work implement (1) according claim 1, wherein the support arm (4) can only be folded into the erect folding position (A1) when the sliding position (Z1, Z2) is predominantly retracted, and/or can only be retracted into the retracted sliding position (Z1) when the folding position (A1, A2) is predominantly erect, when the gearbox (5) is shifted into the shift position (G2).

5. The agricultural work implement (1) according to claim 1, wherein the telescoping and/or pivoting of the support arm (4) and/or the adjustment of the gearbox (5) is carried out at least partially in succession and/or at least partially simultaneously to set up the road operation.

6. The agricultural work implement (1) according to claim 1, wherein the electronic control device (8), to set up road operation, is configured to control the gearbox (5) to:

first shifts from the home position (G1) to the shift position (G2) when the support arm (4) is shifted to the retracted sliding position (Z1); or first shifts from the home position (G1) to the shift position (G2) when the support arm (4) is pivoted into the erect folding position (A1); or shifts from the home position (G1) to the shift position (G2), whereas the support arm (4), starting from the flat position (A3), is pivoted into the erect folding position (A1), if the length of the support arm (4) is greater than the limit length and the pivot angle of the support arm (4) is less than or equal to the limit angle.

7. The agricultural work implement (1) according to claim 2, wherein the electronic control device (8) is configured to switch the gearbox (5) from an in-service mode to an out-of-service mode, either by manual set up of an operator, or when the support arm (4) is folded into an intermediate position (A3) relative to the flat position (A3), into a headland position or higher.

8. The agricultural work implement (1) according to claim 2, wherein the electronic control device (8) is configured to carry out the setting up of the road operation only in an out-of-service mode.

9. The agricultural work implement (1) according to claim 7, wherein the electronic control device (8) is configured to carry out the setting up of the road operation only in the out-of-service mode.

10. The agricultural work implement (1) according to claim 1, wherein the attachment frame (2) includes a guide means (54) for reversibly shifting the gearbox (5), which extends in a shift direction (51), in a direction of travel (91).

11. The agricultural work implement (1) according to claim 1, further comprising an actuator (56) for telescoping and/or pivoting the support arm (4) and/or for adjusting the gearbox (5), wherein the actuator (56) can:

either be actuated independently of one another; or at least partially be interconnected for simultaneous actuation.

12. The agricultural work implement (1) according to claim 1, further comprising a telescoping input shaft (52), which is arranged between the gearbox (5) and the power take-off shaft of the towing vehicles and is connected by means of a universal joint (523) and/or a disconnect coupling with the gearbox (5).

13. The agricultural work implement (1) according to claim 2, wherein the work implement (1) comprises two aggregates (3), and in that the electronic control device (8) is configured to change the position (A1, A2, A3, Z1, Z2, Z3) of both aggregates (3) simultaneously.

* * * * *